US012375177B2

(12) United States Patent
Zhong et al.

(10) Patent No.: US 12,375,177 B2
(45) Date of Patent: Jul. 29, 2025

(54) SIGNAL PROCESSING METHOD AND DEVICE, STORAGE MEDIUM, AND ELECTRONIC DEVICE

(71) Applicant: ZTE Corporation, Shenzhen (CN)

(72) Inventors: Yiming Zhong, Shenzhen (CN); Bo Yang, Shenzhen (CN); Xingang Huang, Shenzhen (CN); Jiangyan He, Shenzhen (CN); Zhuang Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 127 days.

(21) Appl. No.: 18/013,400

(22) PCT Filed: Jun. 29, 2021

(86) PCT No.: PCT/CN2021/103096
§ 371 (c)(1),
(2) Date: Dec. 28, 2022

(87) PCT Pub. No.: WO2022/002045
PCT Pub. Date: Jan. 6, 2022

(65) Prior Publication Data
US 2023/0224041 A1 Jul. 13, 2023

(30) Foreign Application Priority Data
Jun. 29, 2020 (CN) .......................... 202010606439.4

(51) Int. Cl.
H04B 10/00 (2013.01)
H04B 10/2525 (2013.01)
(Continued)

(52) U.S. Cl.
CPC ..... H04B 10/2525 (2013.01); H04B 10/2543 (2013.01)

(58) Field of Classification Search
CPC .............. H04B 10/616; H04B 10/6161; H04B 10/6162; H04B 10/6163; H04B 10/6164; H04B 10/6165
See application file for complete search history.

(56) References Cited

U.S. PATENT DOCUMENTS

2013/0108260 A1  5/2013  Yan
2013/0308960 A1  11/2013  Horikoshi et al.
(Continued)

FOREIGN PATENT DOCUMENTS

CN  103460659 A  12/2013
CN  104683031 A  6/2015
(Continued)

OTHER PUBLICATIONS

International Search Report for corresponding application PCT/CN2021/103096 filed Jun. 29, 2021; Mail date Sep. 29, 2021.
(Continued)

Primary Examiner — Daniel G Dobson
(74) Attorney, Agent, or Firm — CANTOR COLBURN LLP

(57) ABSTRACT

Provided are a signal processing method and apparatus, a storage medium, and an electronic apparatus. The method is applied to an optical communication receiving end, and comprises: after receiving an optical analog signal, converting the optical analog signal into a digital signal; and performing nonlinear effect compensation processing on the digital signal.

11 Claims, 5 Drawing Sheets

(51) Int. Cl.
*H04B 10/2543* (2013.01)
*H04J 14/00* (2006.01)

(56) References Cited

U.S. PATENT DOCUMENTS

| | | | |
|---|---|---|---|
| 2015/0071630 A1 | 3/2015 | Oyama et al. | |
| 2017/0163350 A1 | 6/2017 | Chien et al. | |
| 2018/0234184 A1* | 8/2018 | Tanimura | H04B 10/079 |
| 2019/0354238 A1* | 11/2019 | Akhbari | G06F 3/0436 |
| 2019/0393965 A1* | 12/2019 | Zhang | H04L 27/2096 |

FOREIGN PATENT DOCUMENTS

| | | |
|---|---|---|
| CN | 108768541 A | 11/2018 |
| CN | 111181655 A | 5/2020 |
| EP | 1755296 A2 | 2/2007 |
| WO | 20111301936 A1 | 10/2011 |
| WO | 2019191099 A1 | 10/2019 |

OTHER PUBLICATIONS

Etushi Yamazaki, "Low Noise Non-Linear Equalization Using Neural Networks and Belief Propagation", May 14, 2019.
European Search Report for corresponding application EP21832170; Mail date Dec. 14, 2023.
Faisal Nadeem Khan, "An Optical Communication's Perspective on Machine Learning and Its Applications", Journal of Lightwave Technology, vol. 37, No. 2, Jan. 15, 2019.
Chinese Office Action for corresponding application 2020106064394 issued Jan. 2, 2025.

\* cited by examiner

SIGNAL PROCESSING METHOD AND DEVICE, STORAGE MEDIUM, AND ELECTRONIC DEVICE

CROSS-REFERENCE TO RELATED APPLICATION

The present disclosure claims priority to patent application no. 202010606439.4, filed to the China National Intellectual Property Administration on Jun. 29, 2020, the disclosure of which is incorporated herein by reference in its entirety.

TECHNICAL FIELD

The present disclosure relates to, but is not limited to, the field of communications.

BACKGROUND

An optical fiber communication system is an important infrastructure for bearing information transfer tasks. Compared with wireless communication, optical fiber communication has the advantages of large bandwidth and low loss, and can support optical transmission networks of dozens of or even hundreds of and thousands of kilometers. an optical interconnection or optical access network between data centers from 2 km to 20 km, or a metropolitan area network or a backbone network of hundreds of and thousands of kilometers, optical fiber analog signals are both damaged by various noises in the entire transmission network, causing reduction of the signal-to-noise ratio of the signals.

SUMMARY

In one aspect, the present disclosure provides a signal processing method, including: after receiving an optical analog signal, the optical analog signal is converted into a digital signal; and nonlinear effect compensation processing is performed on the digital signal.

In another aspect, an embodiment of the present disclosure further provides a signal processing apparatus, including: a conversion module, configured to convert, after receiving an optical analog signal, the optical analog signal into a digital signal; and a processing module, configured to perform nonlinear effect compensation processing on the digital signal.

In another aspect, an embodiment of the present disclosure further provides a computer-readable storage medium, the computer-readable storage medium storing a computer program, wherein the computer program is configured to execute, when running, any method described herein.

In another aspect, an embodiment of the present disclosure further provides an electronic apparatus, including a memory and a processor, wherein the memory stores a computer program, and the processor is configured to run the computer program to execute any method described herein.

DETAILED DESCRIPTION OF THE EMBODIMENTS

Hereinafter, embodiments of the present disclosure are described in detail with reference to the accompanying drawings and in conjunction with the embodiments.

It is to be noted that the terms "first", "second", etc. in the description, claims and drawings of the present disclosure are used to distinguish similar objects, and are not necessarily used to describe a specific sequence or a precedence order.

An optical fiber communication system is an important infrastructure for bearing information transfer tasks. Compared with wireless communication, optical fiber communication has the advantages of large bandwidth and low loss, and can support optical transmission networks of dozens of or even hundreds of and thousands of kilometers. Whether an optical interconnection or optical access network between data centers from 2 km to 20 km, or a metropolitan area network or a backbone network of hundreds of and thousands of kilometers, optical fiber analog signals are both damaged by various noises in the entire transmission network, causing reduction of the signal-to-noise ratio of the signals. There are two factors having the greatest effect: one is inter-symbol interference (ISI) caused by various dispersion in the optical fiber and limited bandwidth of optoelectronic devices, and the other is the influence of many nonlinear effects in the transmission network. Therefore, in order to accurately send received signals to a terminal user, compensation and recovery of the signals need to be performed at a receiving side in cooperation with digital signal processing.

In the related art, the digital signal processing mainly compensates the inter-symbol interference caused by dispersion in the optical fiber link and limited bandwidth of devices, but cannot well process the signal damage caused by the nonlinear effects in the link.

Figure 1:
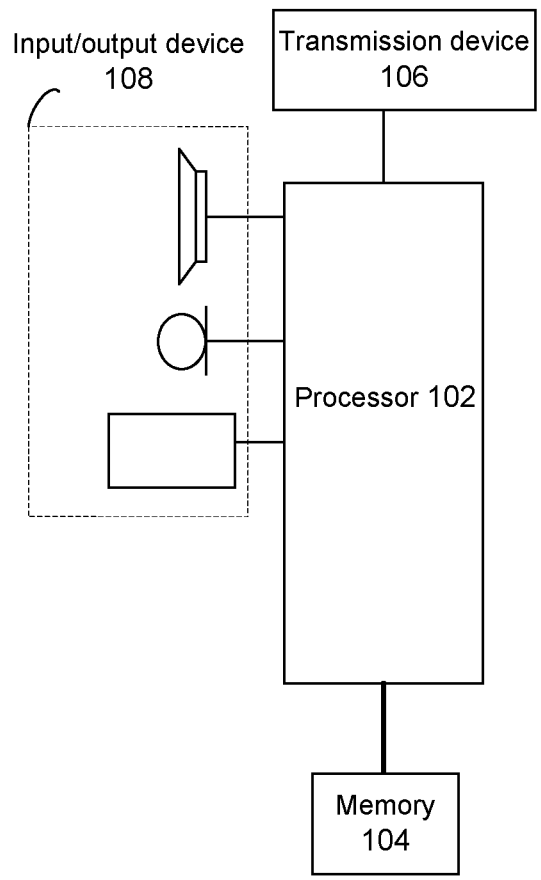
FIG. 1 is a structural block diagram of hardware of an optical communication receiving end for implementing a signal processing method of the present disclosure.

The method provided in the present disclosure may be executed in an optical communication receiving end or a similar receiving apparatus. Taking running the method on an optical communication receiving end as an example, FIG. 1 is a structural block diagram of hardware of an optical communication receiving end for implementing a signal processing method of the present disclosure. As shown in FIG. 1, the optical communication receiving end may include: one or more (FIG. 1 shows only one) processors 102 (the processors 102 may include, but not limited to processing apparatus such as a micro processor, MCU or a programmable logic device, FPGA), and a memory 104 configured to store data; wherein the optical communication receiving end can further include a transmission device 106 and an input/output device 108 for communication functions. A person of ordinary skill in the art would understand that the structure shown in FIG. 1 is merely exemplary, and does not limit the structure of the optical communication receiving end. For example, the optical communication receiving end may also include more or fewer assemblies than those shown in FIG. 1, or have different configuration from that shown in FIG. 1.

The memory 104 may be configured to store a computer program, for example, a software program and module of application software, such as a computer program corresponding to the signal processing method of the present disclosure; and the processor 102 executes various functional applications and data processing by running the computer program stored in the memory 104, i.e. implementing the described method. The memory 104 may include a high-speed random access memory, and may also include a non-transitory memory, such as one or more magnetic storage apparatuses, flash memories or other non-transitory solid-state memories. In some examples, the memory 104 may further include memories remotely arranged with respect to the processors 102, and these remote memories may be connected to the optical communication receiving end via a network. Examples of the network include, but are not limited to the Internet, an intranet, a local area network, a mobile communication network and combinations thereof.

The transmission device 106 is configured to receive or send data via a network. Specific examples of the network may include a wireless network provided by a communication provider of the optical communication receiving end. In one example, the transmission device 106 includes a network interface controller (NIC for short) which may be connected to other network devices by means of a base station, thereby being able to communicate with the Internet. In one example, the transmission device 106 may be a radio frequency (RF for short) module which is configured to communicate with the Internet in a wireless manner.

It should be noted that the optical communication receiving end can further include an analog-to-digital conversion module configured to convert an optical analog signal into a digital signal, and then the processors 102 are used to run the computer program stored in the memory 104 to further process the digital signal.

Figure 2:
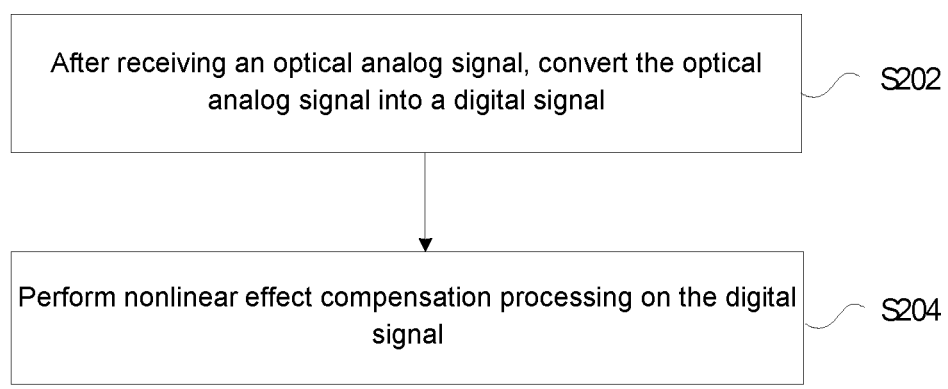
FIG. 2 is a flowchart of a signal processing method according to the present disclosure.

The present disclosure provides a signal processing method running at the optical communication receiving end. FIG. 2 is a flowchart of a signal processing method according to the present disclosure. As shown in FIG. 2, the method can include the following steps S202 and S204.

In step S202, after receiving an optical analog signal, the optical analog signal is converted into a digital signal.

In step S204, nonlinear effect compensation processing is performed on the digital signal.

By means of the steps, after the optical analog signal is converted into a digital signal, nonlinear effect compensation processing is performed on the digital signal, and thus the problem in the related art that nonlinear damage in an optical communication process cannot be well processed can be solved, thereby achieving the technical effect of improving the signal processing accuracy.

In some exemplary embodiments, the steps that after the optical analog signal is converted into the digital signal, linear filtering processing is performed on the digital signal, and nonlinear effect compensation processing is performed on the digital signal, include: the nonlinear effect compensation processing is performed on the digital signal after the linear filtering processing.

It should be noted that the linear filtering processing can compensate the inter-symbol interference caused by dispersion in the optical fiber link and limited bandwidth of devices, so as to better correct the signals. After the linear filtering processing, nonlinear effect compensation processing is performed on the digital signal, so that the nonlinear damage in the optical communication process can be further compensated, thereby better correcting the signals.

It should be further noted that in the present disclosure, the digital signal subjected to the nonlinear effect compensation processing may be a signal not subjected to linear filtering processing. That is to say, in some other exemplary embodiments, after the optical analog signal is converted into the digital signal, nonlinear effect compensation processing can be performed on the digital signal first, and then linear filtering processing is performed on the digital signal subjected to the nonlinear effect compensation processing.

In some exemplary embodiments, the method further includes: after performing the nonlinear effect compensation processing on the digital signal, a processing error is determined according to the digital signal after the nonlinear effect compensation processing, wherein the processing error is used for indicating an error between the processed digital signal and a preset processing target; and a tap coefficient is adjusted according to the processing error, wherein the tap coefficient is used for performing the linear filtering processing on the digital signal.

It should be noted that by adjusting the tap coefficient using an error between the processed digital signal and the processing target, the processing effect of the linear filtering processing can be better optimized, so as to continuously approach the processing target. The processing target may be a target of some preset processing parameters, such as a threshold and a preset range.

In some exemplary embodiments, the method further includes: after performing nonlinear effect compensation processing on the digital signal, linear filtering processing is performed on the digital signal subjected to the nonlinear effect compensation processing.

In some exemplary embodiments, the method further includes: after performing the nonlinear effect compensation processing on the digital signal, a processing error is determined according to the digital signal after the nonlinear effect compensation processing, wherein the processing error is used for indicating an error between the processed digital signal and a preset processing target; and a tap coefficient is adjusted according to the processing error, wherein the tap coefficient is used for performing the linear filtering processing on the digital signal.

In some exemplary embodiments, the step that nonlinear effect compensation processing is performed on the digital signal includes: the nonlinear effect compensation processing is performed on the digital signal by using an activation function.

In some exemplary embodiments, the activation function satisfies the following conditions: a response curve of the activation function is a nonlinear function curve; and the activation function is a monotonically increasing or monotonically decreasing function; and the activation function is smooth and differentiable within a data range of the digital signal.

In some exemplary embodiments, the activation function also satisfies at least one of the following conditions: an output value of the activation function ranges from 0 to 1 or from −1 to 1; and a derivative of the activation function can be taken. It should be noted that the output value of the activation function ranging from 0 to 1 or from −1 to 1 can make the activation function consistent with logic value after symbol de-mapping of the communication system, which facilitates the processing of the digital signal.

In some exemplary embodiments, the activation function includes one of: Sigmoid function, Tanh function, or Leaky rectified linear unit (ReLU) function.

From the description of the described embodiments, a person skilled in the art would have been able to clearly understand that the methods in the described embodiments may be implemented by using software and necessary general hardware platforms, and of course may also be implemented using hardware, but in many cases, the former is a better embodiment. On the basis of such understanding, the portion of the technical solution of the present disclosure that contributes in essence or contributes to the prior art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to perform the methods described in various embodiments of the present disclosure.

The present disclosure further provides a signal processing apparatus, the apparatus is configured to implement the described embodiments and preferred embodiments, and what has been described will not be repeated again. As used below, the term "module" may implement a combination of software and/or hardware of predetermined functions. Although the apparatus described in the following embodiments is preferably implemented in software, implementation in hardware or a combination of software and hardware is also possible and could have been conceived.

Figure 3:
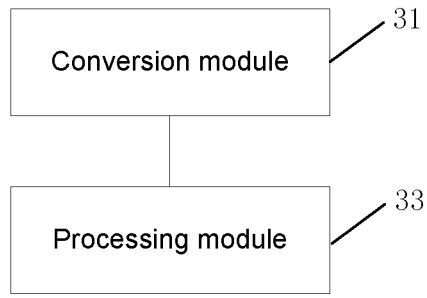
FIG. 3 is a structural block diagram of a signal processing apparatus according to the present disclosure.

FIG. 3 is a structural block diagram of a signal processing apparatus according to the present disclosure. As shown in FIG. 3, the apparatus includes: a conversion module 31, configured to convert, after receiving an optical analog signal, the optical analog signal into a digital signal; and a processing module 33, configured to perform nonlinear effect compensation processing on the digital signal.

By means of the steps, after the optical analog signal is converted into a digital signal, nonlinear effect compensation processing is performed on the digital signal, and thus the problem in the related art that nonlinear damage in an optical communication process cannot be well processed can be solved, thereby achieving the technical effect of improving the signal processing accuracy.

In some exemplary embodiments, the apparatus further includes: a linear filtering module, configured to perform linear filtering processing on the digital signal after converting the optical analog signal into the digital signal; and the processing module is further configured to perform the nonlinear effect compensation processing on the digital signal after the linear filtering processing.

In some exemplary embodiments, the apparatus further includes: a determination module, configured to after performing the nonlinear effect compensation processing on the digital signal, determine a processing error according to the digital signal after the nonlinear effect compensation processing, wherein the processing error is used for indicating an error between the processed digital signal and a preset processing target; and the linear filtering module, further configured to adjust a tap coefficient according to the processing error, wherein the tap coefficient is used for performing the linear filtering processing on the digital signal.

In some exemplary embodiments, the apparatus further includes: the linear filtering module, configured to after performing nonlinear effect compensation processing on the digital signal, perform linear filtering processing on the digital signal subjected to the nonlinear effect compensation processing.

In some exemplary embodiments, the apparatus further includes: a determination module, configured to after performing the nonlinear effect compensation processing on the digital signal, determine a processing error according to the digital signal after the nonlinear effect compensation processing, wherein the processing error is used for indicating an error between the processed digital signal and a preset processing target; and the linear filtering module, further configured to adjust a tap coefficient according to the processing error, wherein the tap coefficient is used for performing the linear filtering processing on the digital signal.

In some exemplary embodiments, the processing module is further configured to perform the nonlinear effect compensation processing on the digital signal by using an activation function.

In some exemplary embodiments, the activation function satisfies the following conditions: a response curve of the activation function is a nonlinear function curve; and the activation function is a monotonically increasing or monotonically decreasing function; and the activation function is smooth and differentiable within a data range of the digital signal.

In some exemplary embodiments, the activation function also satisfies at least one of the following conditions: an output value of the activation function ranges from 0 to 1 or from −1 to 1; and a derivative of the activation function can be taken. In some exemplary embodiments, the activation function includes one of: Sigmoid function, Tanh function, or Leaky ReLU function.

It should be noted that the described modules may be implemented by software or hardware. The latter may be implemented in the following manner, but is not limited thereto: all the described modules are located in the same processor; or all the modules are located in different processors in any arbitrary combination manner.

In the present disclosure, on a linear equalizer architecture, a nonlinear activation function is added, so that the linear equalizer architecture has a certain nonlinear response, thereby compensating nonlinear effects. Regarding the situation in the related art that nonlinear factors cannot be well compensated, the present disclosure proposes a novel equalization compensation architecture, so that the equalizer can not only eliminate the effect of inter-symbol interference, but also perform certain nonlinear compensation.

The present disclosure is mainly directed to nonlinear effects caused by an optical fiber and devices, etc. in an optical fiber transmission link, and compensates the nonlinear effects of received signals sent to the equalizer in a digital domain, wherein the compensation can be implemented by a computer software algorithm.

Figure 4:
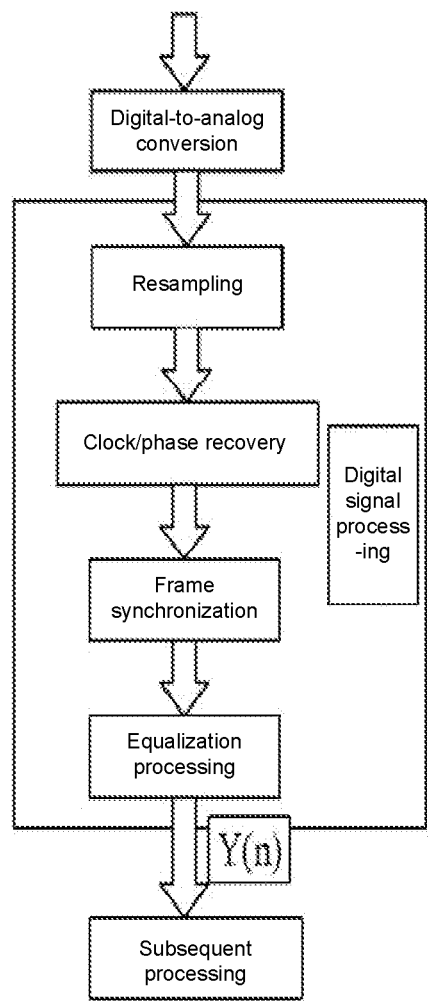
FIG. 4 is a schematic diagram of a process of digital signal processing at a receiving end according to exemplary embodiments of the present disclosure.

FIG. 4 is a schematic diagram of a process of digital signal processing at a receiving end according to exemplary embodiments of the present disclosure. As shown in FIG. 4, the process includes the following steps: first, a received analog signal in an optical fiber is converted into a digital signal by means of a digital-to-analog conversion module, and then the digital signal is sent to a digital signal processing chip for data recovery and compensation. The digital signal processing chip generally includes the following several functions: resampling: a sampling rate is made to become an integral multiple sampling rate required for signal recovery; clock/phase recovery: a receiving end system is made to recover a clock signal of data, and to find an optimal sampling point and phase point of the data; frame synchronization: synchronization is performed to find a frame header; and equalization processing: inter-symbol interference introduced by dispersion and other factors during network transmission is compensated, wherein the equalization processing further includes: nonlinear effect compensation processing is performed on the signal by using an activation function.

On the basis of an equalization compensation architecture, the present disclosure adds a nonlinear compensation module, and aims to enable the novel equalizer to have the capability of compensating for nonlinear signals. The nonlinear compensation module in the present disclosure can be a nonlinear activation function module.

In some exemplary embodiments, for an equalization technology module, structures such as Feed Forward Equalization (FFE), Decision Feedback Equalization (DFE) or FFE+DFE may be adopted on the equalizer architecture.

In some exemplary embodiments, the nonlinear activation function should simultaneously satisfy at least the following three conditions: a response curve of the activation function module needs to be a nonlinear function curve; the activation function should satisfy the characteristics of monotonically increasing/monotonically decreasing, and an output value thereof should range from 0 to 1 or from −1 to 1, and is consistent with logic value after symbol de-mapping of the communication system; and the activation function should satisfy the characteristic of being smooth and differentiable within a data range.

In some exemplary embodiments, the derivative of the function may be embodied in a system algorithm, and thus the derivative of the function should have a characteristic of being easily obtained.

In some exemplary embodiments, in terms of selection of linear filters, the equalizer provided by the present disclosure is suitable for a plurality of architectures including a feed forward equalizer (FFE), a decision feedback equalizer (DFE) and a feed forward equalizer together with a decision feedback equalizer (FFE+DFE).

In some exemplary embodiments, in terms of selection of a training mode of the equalizer, the equalizer provided by the present disclosure may include on the basis of training sequences and blind equalization modes and other training modes, such as a constant modulus algorithm.

In some exemplary embodiments, in terms of selection of convergence algorithms, the equalizer provided by the present disclosure may include common algorithms such as Least Mean Square (LMS) algorithm and Recursive Least Square (RLS) algorithm.

The digital processing solution on a nonlinear algorithm for compensating a link provided in the present disclosure can perform certain compensation on nonlinear distortion in a link. On the basis of a conventional common equalizer architecture, only one nonlinear activation function is added, so that technology iterative upgrading is easy to be performed in a conventional technical reserve, and the hardware system architecture does not vary greatly, facilitating implementation.

Figure 5:
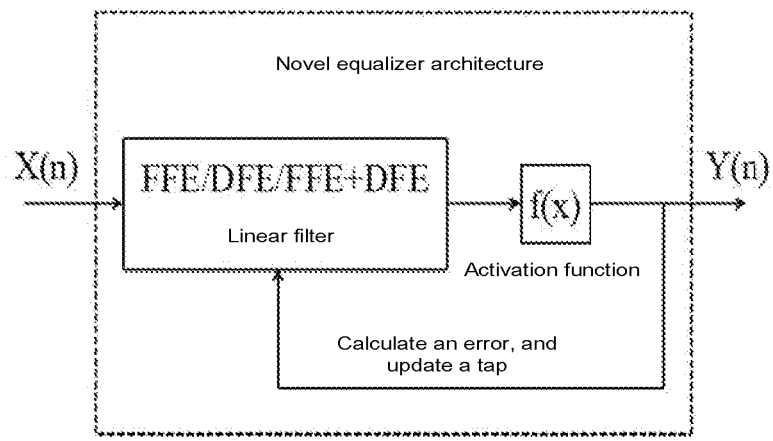
FIG. 5 is a schematic diagram of architecture of an equalizer according to exemplary embodiments of the present disclosure.

FIG. 5 is a schematic diagram of an architecture of an equalizer according to exemplary embodiments of the present disclosure. As shown in FIG. 5, the equalizer architecture may be equivalent to a linear filter, and is used to compensate for the inter-symbol interference situation in a signal, but cannot compensate for nonlinearity in the signal. A nonlinear activation function may be added to the equalizer architecture, in order to compensate for nonlinear portions in the signal. The signal processing flow may include the following steps:

step I, a digital signal X(n) sent to a novel equalizer for processing is first processed by a linear filter module, wherein the linear filter architecture includes FFE, DFE, FFE+DFE, etc., and this step can use a linear filter processing flow or method, which is not limited in the present disclosure; and step II, the digital signal pre-processed by the linear filter is then sent to the nonlinear activation function module to generate a nonlinear response, and this step functions to compensate for the nonlinear problem in the system link. For the specific processing flow of this step, reference may be made to other exemplary embodiments.

It should be emphasized that the signal processing in the related art does not have the step of a nonlinear activation function, and the whole equalizer architecture is a linear system, and can only compensate the inter-symbol interference on the result, but cannot eliminate nonlinear factors. Herein, the activation function serves to increase the nonlinear response of the whole equalizer on data.

In some exemplary embodiments, the selection of an activation function needs to satisfy the following several limitation requirements:

1. an input/output response curve of the activation function module needs to be a nonlinear function;
2. the activation function should satisfy the characteristics of monotonically increasing/monotonically decreasing, and an output value thereof should range from 0 to 1 or from −1 to 1, and is consistent with logic value after symbol de-mapping of the communication system; and
3. the activation function should satisfy the characteristic of being smooth and differentiable within a data range.

In some exemplary embodiments, the derivative of the function may be embodied in a system algorithm, and thus the derivative of the function should have a characteristic of being easily obtained.

In some exemplary embodiments, the nonlinear activation function may include, for example, Sigmoid: $y=1/(1+e^{-x})$ function, Tanh: $y=(1-e^{-x})/(1+e^{-x})$ function, or Leaky ReLU function, etc.

As shown in FIG. 5, in some exemplary embodiments, a part of an output signal Y(n) after nonlinear processing is sent back to the linear filter, and a filter tap coefficient of the linear filter is reversely modified according to a certain algorithm and error calculation. The purpose of this step is to make a frequency response curve of the linear filter better adapted to the performance of the transmission system. For the specific processing flow of this step, reference may be made to other exemplary embodiments.

In addition, no compulsive requirement is imposed on a target training mode and convergence algorithm of the feed forward equalizer, and a plurality of training modes may be applied. The described contents are only illustrative, and the present disclosure is not limited thereto.

Figure 6:
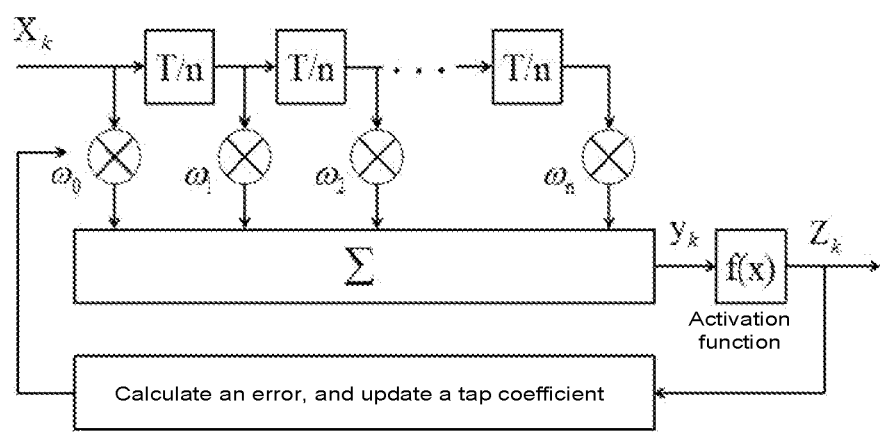
FIG. 6 is a schematic diagram of architecture of a feed forward equalizer according to exemplary embodiments of the present disclosure.

FIG. 6 is a schematic diagram of an architecture of a feed forward equalizer according to exemplary embodiments of the present disclosure. As shown in FIG. 6, a digital bit signal $X_k$ that needs to be equalized is delayed by T/n seconds through a fractional delayer, where T is a symbol period corresponding to one bit of data, and n is an up-sampling multiple of resampling. The number of delayers may be optimized according to actual requirements. Regarding the delayed data, each piece of data is multiplied by a multiplier and then added. $\omega_0$ to $\omega_n$ are tap coefficients by which each piece of data is previously multiplied when passing through the multiplier. At first, an initial value is set for the tap coefficient, and subsequent values are adaptively updated on the basis of training targets under a certain convergence condition. Result $y_k$ obtained by accumulating tap coefficients outputs a nonlinear value $z_k$ through a nonlinear activation function f(x), and at the same time, the output data is fed back backwards, and a forward tap coefficient is reversely updated on the basis of a certain convergence condition.

Figure 7:
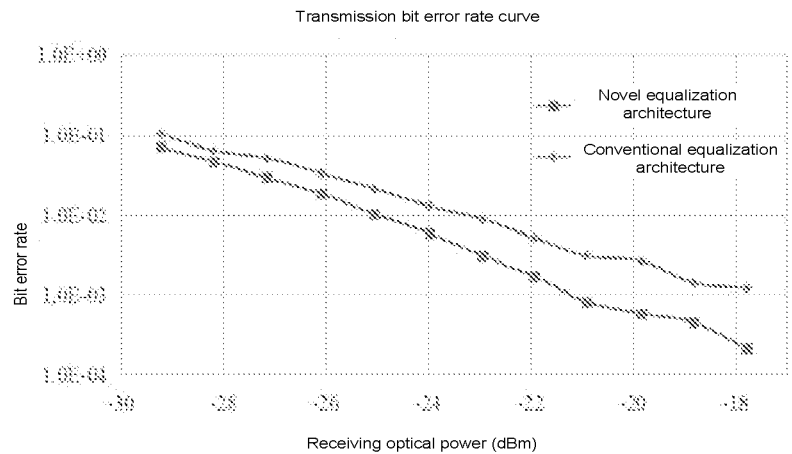
FIG. 7 is a schematic diagram of comparison between equalization effect of an equalization architecture according to exemplary embodiments of the present disclosure and equalization effect of an equalizer architecture in the related art.

FIG. 7 is a schematic diagram of comparison between equalization effect of an equalization architecture according to exemplary embodiments of the present disclosure and equalization effect of an equalizer architecture in the related art, and illustrates a comparison result of transmission performance for a simplified coherent experiment system between an equalizer architecture according to exemplary embodiments of the present disclosure and a conventional FFE equalizer architecture algorithm. In the simplified coherent system, nonlinear sources of the whole link include nonlinearity in a sending end laser, nonlinear detection in a receiving end photodetector, and nonlinear effect of an envelope detection manner during post-end analog signal processing, etc. The conventional linear equalizer architecture mainly compensates the inter-symbol interference in a signal, and concerning the error code condition of 1e-2, the receiving optical power thereof is -23 dBm. Correspondingly, according to the novel equalizer architecture of the present disclosure, certain nonlinear compensation is also performed while compensating the inter-symbol interference, and while also concerning the error code condition of 1e-2, the receiving optical power thereof is about -25 dBm, and the performance is improved by about 2 dB.

Figure 8:
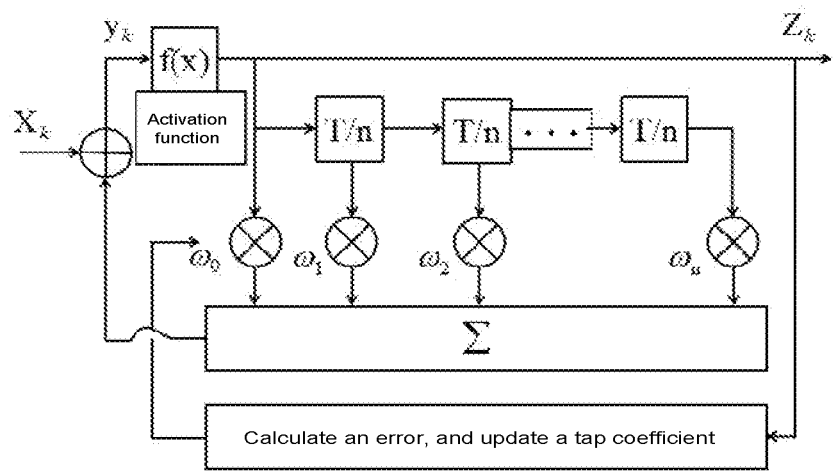
FIG. 8 is a schematic diagram of an architecture of a decision feedback equalizer according to exemplary embodiments of the present disclosure.

FIG. 8 is a schematic diagram of an architecture of a decision feedback equalizer according to exemplary embodiments of the present disclosure, which is an embodiment of adding a nonlinear activation function on the basis of a current decision feedback equalizer (DFE) architecture. As shown in FIG. 8, the difference from the feed forward equalizer lies in that: a data bit signal inputted thereby first passes through a nonlinear activation function, and after nonlinear data Zk is outputted, one path thereof is taken as an output, and the other path thereof is sent to each delayer and subjected to a fractional delay of T/n seconds, where T is a symbol period corresponding to one bit of data, and n is an up-sampling multiple of resampling. The number of delayers may be optimized according to actual requirements. Regarding the delayed data, each piece of data is multiplied by a multiplier and then added. $\omega_0$ to $\omega_n$ are tap coefficients by which each piece of data needs to be previously multiplied. At first, an initial value is set for the tap coefficient, and subsequent values of the tap coefficient are adaptively updated on the basis of training targets under a certain convergence condition. The convergence condition includes LMS (Least Mean Square), RLS (Recursive Least Square), CMA (Constant Modulus Algorithm), etc.

Figure 9:
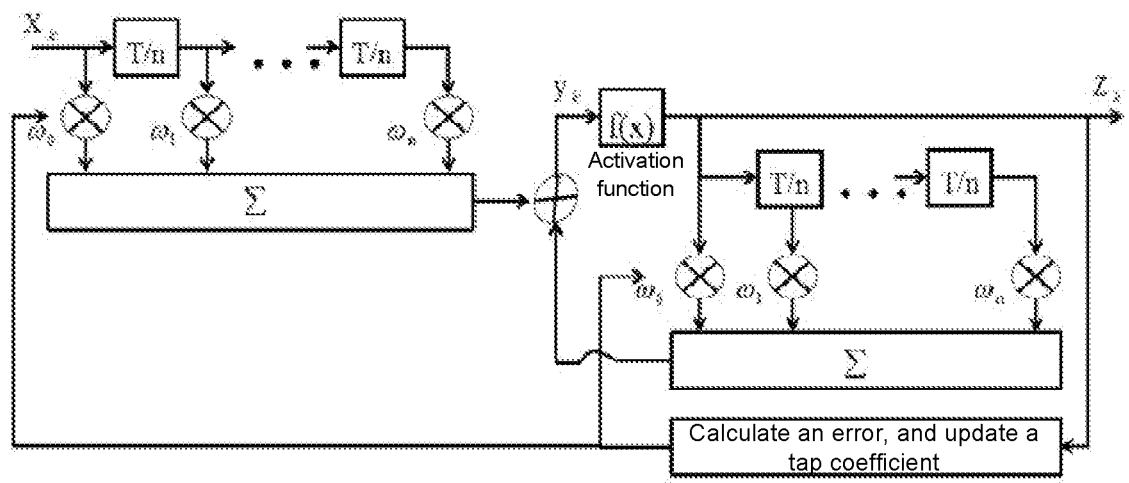
FIG. 9 is a schematic diagram of architecture of feed forward and decision feedback equalizers according to exemplary embodiments of the present disclosure.

FIG. 9 is a schematic diagram of an architecture of feed forward and decision feedback equalizers according to exemplary embodiments of the present disclosure, which is an embodiment where a nonlinear activation function is added on the basis of an equalizer architecture combining a feed forward equalization (FFE) architecture and a decision feedback equalization (DFE) architecture. As shown in FIG. 9, received data bit streams are first summed by a feed forward equalizer architecture and then used as an input to a next decision feedback equalizer architecture. Meanwhile, nonlinear data $Z_k$ outputted by the decision feedback equalizer through a nonlinear activation function adaptively updates the tap coefficients of the FFE and the DFE through a certain convergence algorithm.

The present disclosure further provides a computer-readable storage medium, the computer-readable storage medium storing a computer program, wherein the computer program is configured to execute, when running, the steps in any one of the methods above.

In some exemplary embodiments, the computer-readable storage medium may include, but is not limited to: any medium that can store a computer program, such as a USB flash drive, a Read-Only Memory (ROM for short), a Random Access Memory (RAM for short), a removable hard disk, a magnetic disk, or an optical disc.

The present disclosure further provides an electronic apparatus, including a memory and a processor, wherein the memory stores a computer program, and the processor is configured to run the computer program, so as to execute the steps in any one of the methods above.

In some exemplary embodiments, the electronic apparatus can further include a transmission device and an input/output device, wherein the transmission device is connected to the processors, and the input/output device is connected to the processors.

For specific examples in the present embodiment, reference can be made to the examples described in the described embodiments and exemplary embodiments, and thus they will not be repeated again in the present embodiment.

It is apparent that a person skilled in the art shall understand that all of the described modules or steps in the present disclosure may be implemented by using a general computing apparatus, may be centralized on a single computing apparatus or may be distributed on a network composed of multiple computing apparatuses. The modules or steps may be implemented by using executable program codes of the computing apparatus, and thus, the program codes may be stored in a storage apparatus and executed by the computing apparatus, and in some cases, the shown or described steps may be executed in a sequence different from that shown herein, or the modules or steps are manufactured into integrated circuit modules, or multiple modules or steps therein are manufactured into a single integrated circuit module for implementation. Thus, the present disclosure is not limited to any specific hardware and software combinations.

The content above merely relates to exemplary embodiments of the present disclosure, and is not intended to limit the present disclosure. For a person skilled in the art, the present disclosure may have various modifications and changes. Any modifications, equivalent replacements, improvements, etc. made within the principle of the present disclosure shall all fall within the scope of protection of the present disclosure.

What is claimed is:

1. A signal processing method, applied to an optical communication receiving end, and comprising:
after receiving an optical analog signal, converting the optical analog signal into a digital signal; and
performing nonlinear effect compensation processing on the digital signal by using an activation function;
after performing the nonlinear effect compensation processing on the digital signal, performing linear filtering processing on the digital signal subjected to the nonlinear effect compensation processing;

after performing the nonlinear effect compensation processing on the digital signal, determining a processing error according to the digital signal after the nonlinear effect compensation processing, wherein the processing error is used for indicating an error between the processed digital signal and a preset processing target; and adjusting a tap coefficient according to the processing error, wherein the tap coefficient is used for performing the linear filtering processing on the digital signal.

2. The method according to claim 1, further comprising:

after converting the optical analog signal into the digital signal, performing linear filtering processing on the digital signal;

wherein performing nonlinear effect compensation processing on the digital signal comprises: performing the nonlinear effect compensation processing on the digital signal after the linear filtering processing.

3. The method according to claim 2, further comprising:

after performing the nonlinear effect compensation processing on the digital signal, determining a processing error according to the digital signal after the nonlinear effect compensation processing, wherein the processing error is used for indicating an error between the processed digital signal and a preset processing target; and adjusting a tap coefficient according to the processing error, wherein the tap coefficient is used for performing linear filtering processing on the digital signal.

4. The method according to claim 1, wherein the activation function satisfies the following conditions:

a response curve of the activation function is a nonlinear function curve; and the activation function is a monotonically increasing or monotonically decreasing function; and the activation function is smooth and differentiable within a data range of the digital signal.

5. The method according to claim 1, wherein the activation function satisfies at least one of the following conditions:

an output value of the activation function ranges from 0 to 1 or from −1 to 1; and a derivative of the activation function can be taken.

6. The method according to claim 1, wherein the activation function comprises one of:

Sigmoid function, Tanh function, Leaky rectified linear unit (ReLU) function.

7. A signal processing apparatus, comprising:

a conversion module, configured to convert, after receiving an optical analog signal, the optical analog signal into a digital signal; and a processing module, configured to perform nonlinear effect compensation processing on the digital signal by using an activation function;

the linear filtering module, configured to after performing nonlinear effect compensation processing on the digital signal, perform linear filtering processing on the digital signal subjected to the nonlinear effect compensation processing;

a determination module, configured to after performing the nonlinear effect compensation processing on the digital signal, determine a processing error according to the digital signal after the nonlinear effect compensation processing, wherein the processing error is used for indicating an error between the processed digital signal and a preset processing target; and the linear filtering module, further configured to adjust a tap coefficient according to the processing error, wherein the tap coefficient is used for performing the linear filtering processing on the digital signal.

8. The signal processing apparatus according to claim 7, further comprising:

a linear filtering module, configured to perform linear filtering processing on the digital signal after converting the optical analog signal into the digital signal; and wherein the processing module is further configured to perform the nonlinear effect compensation processing on the digital signal after the linear filtering processing.

9. The signal processing apparatus according to claim 8, further comprising: a determination module, configured to after performing the nonlinear effect compensation processing on the digital signal, determine a processing error according to the digital signal after the nonlinear effect compensation processing, wherein the processing error is used for indicating an error between the processed digital signal and a preset processing target; and the linear filtering module is further configured to adjust a tap coefficient according to the processing error, wherein the tap coefficient is used for performing the linear filtering processing on the digital signal.

10. The signal processing apparatus according to claim 7, wherein the activation function satisfies the following conditions:

a response curve of the activation function is a nonlinear function curve; and the activation function is a monotonically increasing or monotonically decreasing function; and the activation function is smooth and differentiable within a data range of the digital signal.

11. The signal processing apparatus according to claim 7, wherein the activation function satisfies at least one of the following conditions:

an output value of the activation function ranges from 0 to 1 or from −1 to 1; and a derivative of the activation function can be taken.

* * * * *